US008804291B2

(12) United States Patent
Becker et al.

(10) Patent No.: US 8,804,291 B2
(45) Date of Patent: Aug. 12, 2014

(54) LINE ISOLATORS FOR ISOLATING MULTIPLE FAULTS IN EMERGENCY SYSTEMS

(75) Inventors: Donald Becker, Bradenton, FL (US); Morris Stoops, Bradenton, FL (US); Vladimir Geyts, Waterloo (CA)

(73) Assignee: UTC Fire & Security Americas Corporation, Inc., Farmington, CT (US)

( * ) Notice: Subject to any disclaimer, the term of this patent is extended or adjusted under 35 U.S.C. 154(b) by 318 days.

(21) Appl. No.: 13/323,435

(22) Filed: Dec. 12, 2011

(65) Prior Publication Data

US 2013/0148245 A1 Jun. 13, 2013

(51) Int. Cl.
*H02H 7/00* (2006.01)

(52) U.S. Cl.
USPC .......................................................... 361/62

(58) Field of Classification Search
CPC ...... G08B 25/04; G08B 25/045; G08B 29/06; G08B 29/123; H02H 3/00; H02H 3/05; H02H 3/06; H02H 7/00; H02H 7/261; H02H 7/30
USPC .......................................................... 361/62
See application file for complete search history.

(56) References Cited

U.S. PATENT DOCUMENTS

| | | | |
|---|---|---|---|
| 4,528,610 A | 7/1985 | Payne | |
| 4,752,698 A | 6/1988 | Furuyama et al. | |
| 4,864,519 A * | 9/1989 | Appleby et al. | 700/292 |
| 5,400,203 A * | 3/1995 | Tice | 361/62 |
| 5,566,082 A | 10/1996 | Suzuki | |
| 6,606,028 B1 * | 8/2003 | Tice et al. | 340/506 |
| 7,508,303 B2 | 3/2009 | Capowski et al. | |

FOREIGN PATENT DOCUMENTS

| | | |
|---|---|---|
| EP | 0 697 684 | 2/1996 |
| GB | 2173618 A | 10/1986 |
| WO | 2012/045997 | 4/2012 |

OTHER PUBLICATIONS

International Search Report and Written Opinion issued by the EPO International Searching Authority for International Application No. PCT/US2012/063230 dated Feb. 8, 2013, 11 Pages.

* cited by examiner

*Primary Examiner* — Jared Fureman
*Assistant Examiner* — Kevin J Comber
(74) *Attorney, Agent, or Firm* — Cantor Colburn LLP

(57) ABSTRACT

A system for isolating faults in emergency systems, the system including first and second power lines, and one or more zones. Each zone has first and second zone line isolators, the first zone line isolator is connected between the first power line and the respective zone, and the second line isolator is connected between the second power line and the respective zone. Each first line isolator is configured to disconnect the zone from the first power line upon occurrence of a short circuit in the zone. Each second line isolator is configured to connect power from the second power line upon occurrence of an open circuit in the zone.

14 Claims, 4 Drawing Sheets

LINE ISOLATORS FOR ISOLATING MULTIPLE FAULTS IN EMERGENCY SYSTEMS

BACKGROUND

The present invention relates generally to serial line isolators, and more specifically, to a method and apparatus for isolating faults in emergency input and notification circuits.

In emergency systems, notification and input devices are powered through the use of input device circuits (IDCs) and notification appliance circuits (NACs). These circuits include several different zones, each containing one or more devices. Input devices include such devices as smoke detectors; and notification devices include such devices as sirens and strobe lights. IDCs and NACs have generally been set up such that the devices are connected to one another in series. Due to this series configuration, a fault in any given zone or device will affect all other zones or devices in the circuit. Regulations require that a fault in one zone does not affect the operation of other zones.

Traditionally, line isolators have been implemented on the notification and input circuits in order to isolate faults in any given zone. These line isolators have been implemented in a series configuration, such that each isolator is connected in series with each zone. If a short circuit fault, such as a wire-to-wire short, is detected in the zone, the line isolators on each end of the zone open, isolating the zone from the rest of the circuit. Power is then supplied on a return path in order to continue to power the devices in the zones which are further down the line from the newly opened isolator.

This past configuration works for isolating a single fault, but does not work to isolate multiple faults in a circuit, or to handle open circuit faults. If a fault occurs in a first zone, and then another fault occurs in a second zone further down the line, there is no way for the system to continue to provide power to any of the intermediate zones. Thus, there is a need to be able to isolate multiple faults in an emergency system without losing operation of any functional zone or device.

SUMMARY

An emergency system includes first and second power lines, a plurality of zones, and first and second line isolators for each zone. The first line isolator is connected between the first power line and the respective zone, and disconnects power from the first power line when a short circuit fault is present in the respective zone. The second line isolator is connected between the second power line and the respective zone, and connects power to the respective zone from the second power line when an open circuit fault is present in the respective zone.

DETAILED DESCRIPTION

The present invention involves a fault isolation system for isolating one or more faults in an emergency system. In particular, the system includes a circuit controller, two power lines, and a plurality of devices divided up into a plurality of zones. The devices within each zone are connected to one another in series. The zones are connected to one another in parallel, and each zone has two dedicated line isolators. The first line isolator is connected between the first power line and a first end of the zone, and remains closed until a short circuit fault is detected in the zone; and the second line isolator is connected between the second power line and a second end of the zone, and remains open until an open circuit fault is detected in the zone. The circuit controller provides power to the two power lines.

Figure 1:
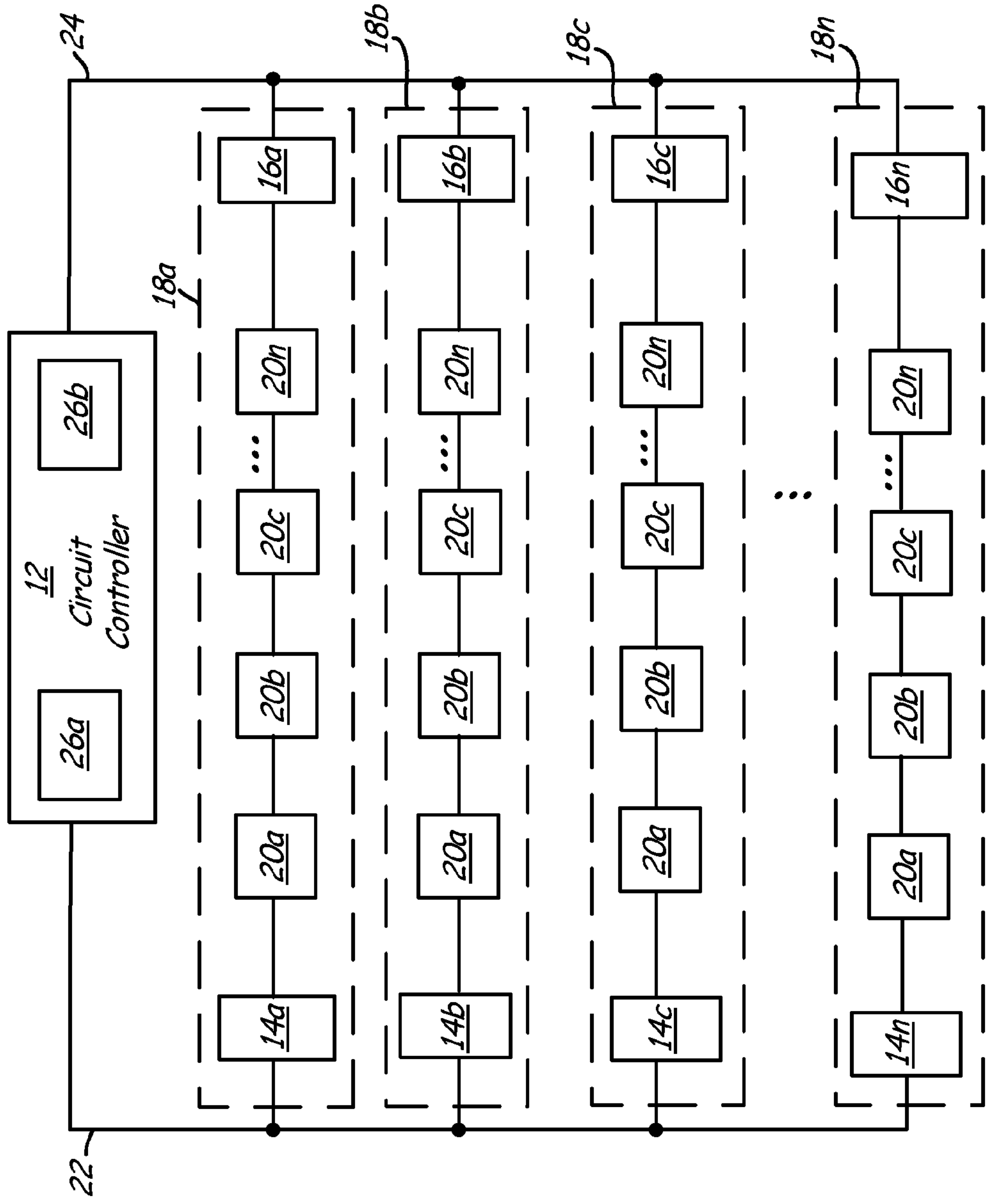
FIG. 1 is a block diagram of an embodiment of the present invention.

FIG. 1 is a block diagram illustrating a system 10 for isolating multiple faults in an emergency notification or input system. System 10 includes circuit controller 12, line isolators 14*a*-14*n* and 16*a*-16*n*, zones 18*a*-18*n*, emergency devices 20*a*-20*n*, power lines 22 and 24, and system line isolators 26*a* and 26*b* which are integral to the circuit controller. Each zone 18*a*-18*n* comprises one or more emergency devices 20*a*-20*n*, which may comprise input devices such as smoke detectors, or notification devices such as sirens and strobe lights. Circuit controller 12 handles communications with the emergency devices 20*a*-20*n*, as well as provides power on power lines 22 and 24. It is possible to have only a single device for each zone, such that every device can be individually isolated.

Isolators 14*a*-14*n*, 16*a*-16*n*, and 26*a*-26*b* are devices that can be either open or closed. In the closed state, the isolator provides a continuous conduction path; and in the open state, the isolator provides a break in the circuit, cutting off power to any devices down the line. Isolators 14*a*-14*n*, 16*a*-16*n*, and 26*a*-26*b* may be implemented using, among other things, a relay, or solid-state devices such as metal-oxide-semiconductor field-effect transistors (MOSFET's). Isolators 14*a*-14*n*, 16*a*-16*n*, 26*a*-26*b* may control themselves, by opening and closing in response to a loss of power, or may be controlled by circuit controller 12.

During normal system operation, all isolators 14*a*-14*n* and 26*a*-26*b* are closed, all isolators 16*a*-16*n* are open, and circuit controller 12 provides power to both power lines 22 and 24. Isolator 26*a* is connected between power line 22 and the circuit controller 12; and isolator 26*b* is connected between power line 24 and circuit controller 12. Isolators 26*a* and 26*b* are included in order to allow they system to disconnect power from circuit controller 12 to power lines 22 and 24 in the event of short circuit faults in system. Therefore, during normal system operation, power flows from circuit controller 12, through power line 22, to each of zones 18*a*-18*n*. Isolators 16*a*-16*n* remain open to prevent zones 18*a*-18*n* from receiving power from both power lines 22 and 24.

Isolators 14*a*-14*n*, and 26*a* are configured to handle short circuit faults. Upon occurrence of a short circuit fault in any of zones 18*a*-18*n*, isolator 26*a* will sense a spike in current and a drop in voltage, and in response, will open, cutting off power from circuit controller 12 to power line 22. All isolators 14*a*-14*n* will sense the loss of power on power line 22, and in response, will also open. Circuit controller 12 will then close isolator 26*a* after a short period of time. Once isolator 26*a* has closed, isolators 14*a*-14*n* will check their respective zones 18*a*-18*n* to determine if there is a short circuit fault present in the zone. This may be accomplished by each isolator 14*a*-14*n* supplying a small current to its respective zone 18*a*-18*n* and monitoring the response. If a zone 18*a*-18*n* contains a short circuit fault, respective isolator 14*a*-14*n* will remain open. Otherwise, if no short circuit fault is present in respective zone 18*a*-18*n*, respective isolator 14*a*-14*n* will close. Therefore, all zones 18*a*-18*n* without short circuit faults will be provided power from power line 22. This procedure can be repeated for any number of short circuit faults in system 10.

For example, if a short circuit fault, such as a wire-to-wire short, occurs between devices 20*b* and 20*c* of zone 18*c*, isolator 26*a* will immediately open after sensing a spike in current on power line 22. All isolators 14*a*-14*n* will then open in response to the loss of power on power line 22 after isolator 26*a* has opened. After isolators 14*a*-14*n* open, isolator 26*a* will close, and remain closed if the short circuit fault is no longer detected on power line 22. Isolators 14*a*-14*n* will then use power from power line 22 to apply a small current to each of their respective zones to determine if there is a short circuit fault present. Isolator 14*c* will detect the short circuit fault and will remain open. All other isolators 14*a*-14*n* will detect no short circuit fault and will close. Power will then be provided from circuit controller 12, through power line 22, to each zone 18*a*-18*n* with no short circuit fault present. Zone 18*c* will be isolated from the rest of the system, and will receive no power from either power line 22 or power line 24.

A second short circuit fault may then be handled in any of the other zones 18*a*-18*n*. If a second short circuit fault occurs in zone 18*a*, isolator 26*a* will again open due to a spike in current on power line 22. Isolators 14*a*-14*n* will open in response to the loss of power on power line 22 due to isolator 26*a* opening. Isolators 14*a*-14*n* will check their respective zones 18*a*-18*n* for short circuit faults by applying a small current to the zone. Isolators 14*a* and 14*c* will both remain open due to detection of a short circuit fault in their respective zones. All other isolators 14*a*-14*n* will close, providing power from power line 22 to each zone 18*a*-18*n* with no short circuit fault. Therefore, zone 18*b* will continue to receive power from power line 22 even though zones 18*a* and 18*c* contain short circuit faults.

Isolators 16*a*-16*n* are configured to handle open circuit faults in any of zones 18*a*-18*n*. If an open circuit fault occurs in any of zones 18*a*-18*n*, respective isolator 16*a*-16*n* will detect the loss of power from the zone and will transition to a closed state. Any devices 20*a*-20*n* that lose power from power line 22 due to the open circuit fault will then receive power from power line 24 and continue to function properly. For example, if there is an open circuit fault between device 20*b* and 20*c* of zone 18*b*, devices 20*c*-20*n* will stop receiving power from power line 22 through isolator 14*b*. Isolator 14*b* remains closed and power continues to be supplied to devices 20*a* and 20*b* from power line 22. Isolator 16*b* will detect the loss of power in zone 18*b* due to the open circuit and will transition to a closed state. Devices 20*c*-20*n* will then receive power from power line 24 and resume functioning properly.

Figure 2:
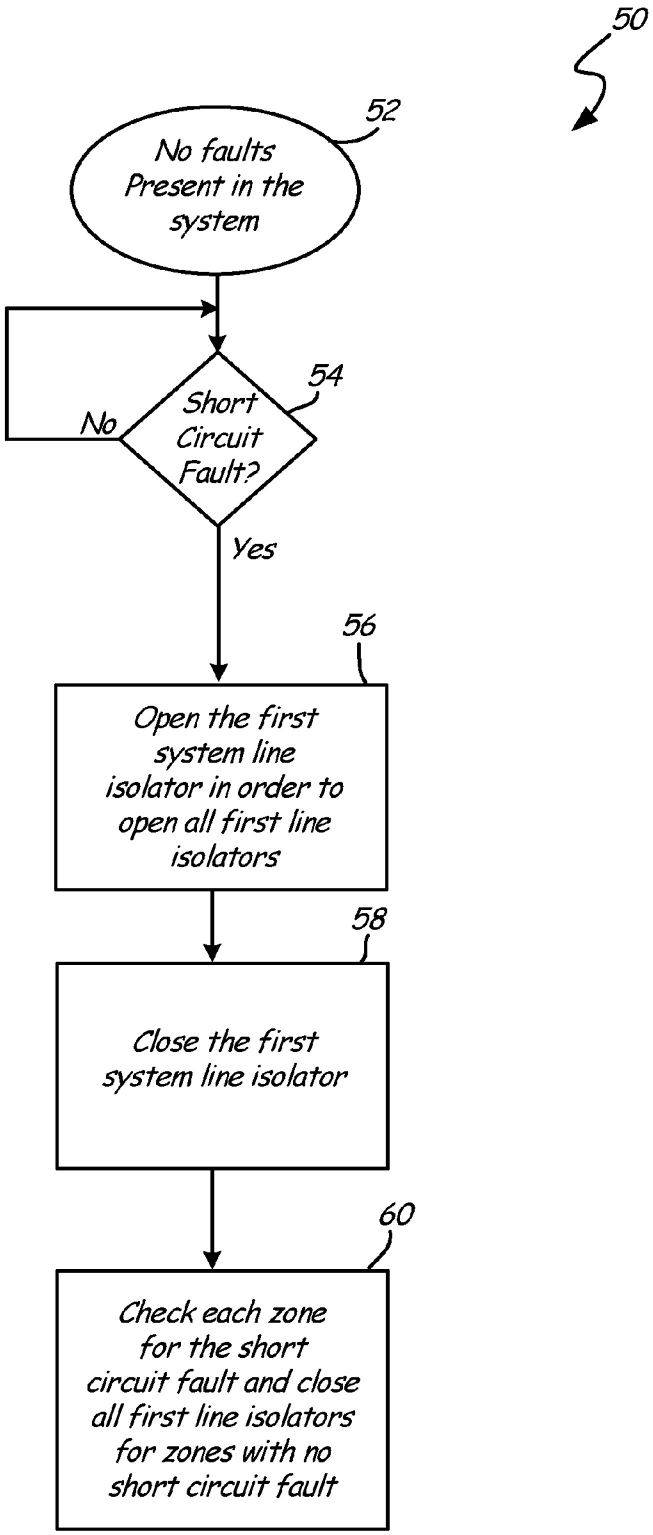
FIG. 2 is a flow chart illustrating isolating a short circuit fault according to an embodiment of the present invention.

FIG. 2 is a flowchart illustrating a method 50 for isolating a short circuit fault in an embodiment of the present invention. At step 52, no faults are present in system 10, all isolators 14*a*-14*n* and 26*a*-26*b* are closed, and all isolators 16*a*-16*n* are open. At step 54, system 10 operates normally until a short circuit fault occurs. When the short circuit fault occurs, system 10 moves to step 56. At step 56, isolator 26*a* opens, causing a loss of power on power line 22. Because of the loss of power on power line 22, all isolators 14*a*-14*n* open. At step 58, each isolator applies a small current to its respective zone 18*a*-18*n* to determine if there is a short circuit fault present in the zone. At step 60, all isolators 14*a*-14*n* without a short circuit fault in its corresponding zone 18*a*-18*n*, close; and circuit controller 12 closes isolator 26*a*.

Figure 3:
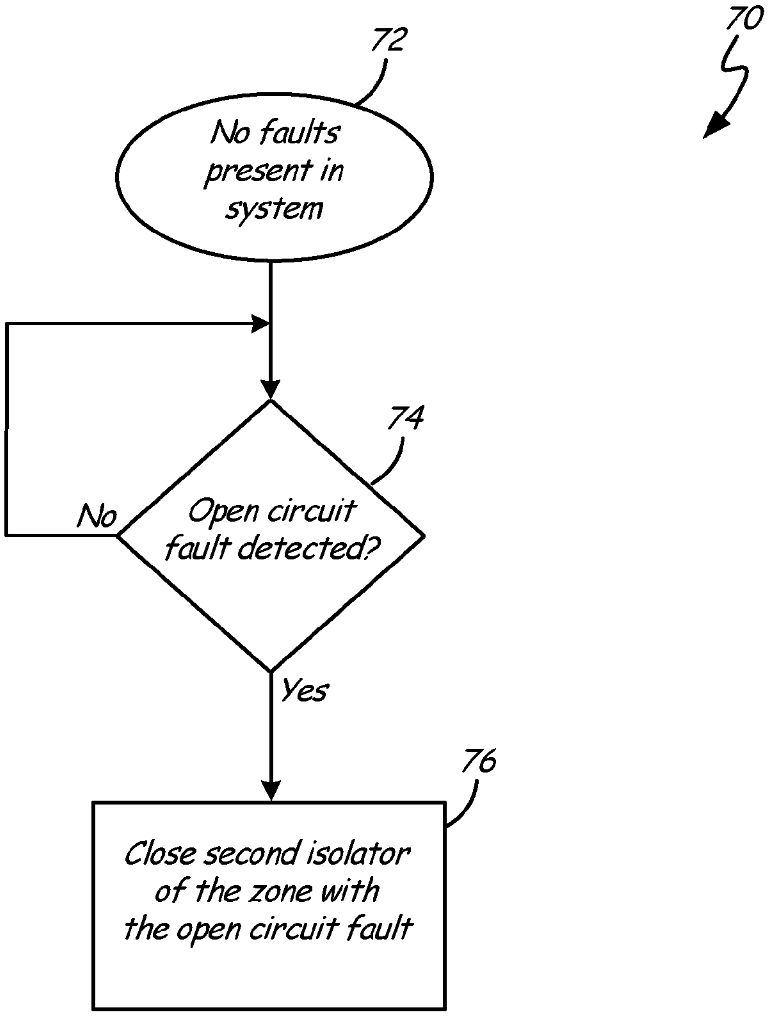
FIG. 3 is a flow chart illustrating isolating an open circuit fault according to an embodiment of the present invention.

FIG. 3 is a flowchart illustrating a method 70 for isolating an open circuit fault in an embodiment of the present invention. At step 72, no faults are present in system 10, all isolators 14*a*-14*n* are closed, and all isolators 16*a*-16*n* are open. At step 74, system 10 operates normally until an open circuit fault is detected. When the open circuit fault is detected, system 10 moves to step 76. At step 76, isolator 16*a*-16*n* that is associated with the zone 18*a*-18*n* that contains the open circuit fault, closes.

Figure 4:
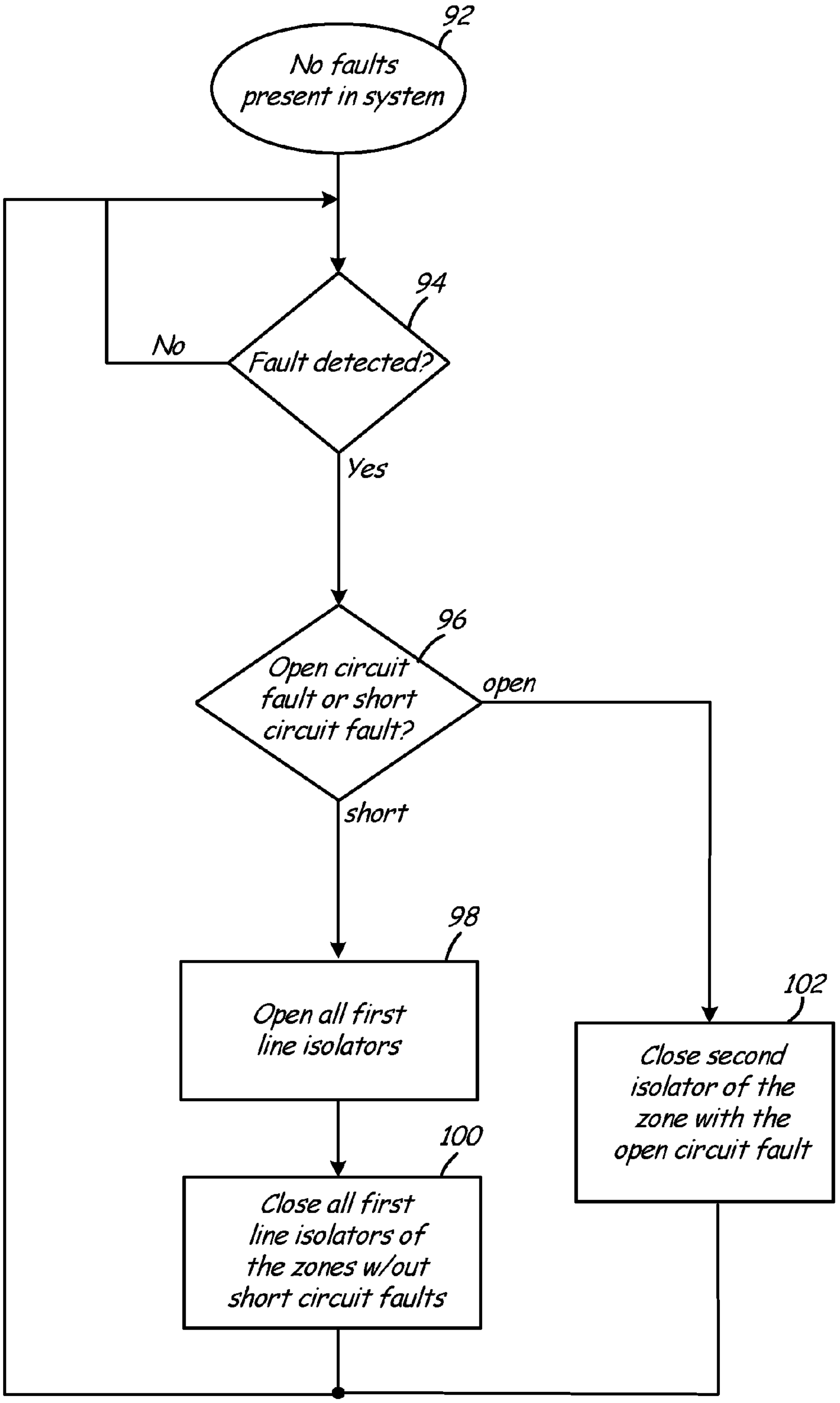
FIG. 4 is a flow chart illustrating handling multiple faults according to an embodiment of the present invention.

FIG. 4 is a flowchart illustrating a method 90 for isolating multiple faults in an embodiment of the present invention. At step 92, no faults are present in system 10, all isolators 14*a*-14*n*, 26*a*, and 26*b* are closed; and all isolators 16*a*-16*n* are open. At step 94, system 10 operates normally until a fault is detected. Once a fault is detected, system 10 moves to step 96. At step 96, it is determined if the fault is a short circuit fault, or an open circuit fault. If the fault is a short circuit fault, system 10 proceeds to step 98. If the fault is an open circuit fault, system 10 proceeds to step 102. At step 98, all isolators 14*a*-14*n*, and 26*a* open. At step 100, circuit controller 12 closes isolator 26*a*; and all isolators 14*a*-14*n* without a short circuit fault in its corresponding zone 18*a*-18*n*, close. At step 102, isolator 16*a*-16*n* that is associated with the zone 18*a*-18*n* that contains the open circuit fault, closes. Following steps 100 and 102, system 10 returns to step 94 and operates normally until another fault is detected.

In this way, the present invention describes a method and apparatus for isolating multiple faults in emergency input and notification circuits. Although the present invention has been described with reference to preferred embodiments, workers skilled in the art will recognize that changes may be made in form and detail without departing from the spirit and scope of the invention.

The invention claimed is:

1. A system for isolating faults in emergency systems, the system comprising:

first and second power lines; and a plurality of zones, each zone including a first zone line isolator connected to the first power line, and a second zone line isolator connected to the second power line, and one or more emergency devices connected between the first zone line isolator and the second zone line isolator, wherein when a short circuit fault is detected in at least one of a plurality of zones, each first zone line isolator is configured to disconnect the first power line from the respective zone, and wherein each of the plurality of zones is configured to determine if the short circuit fault is present in the zone, and wherein each first zone line isolator is configured to close for each respective zone that does not contain the short circuit fault in order to rovide ower to the respective zone from the first power line.

2. The system of claim 1, wherein the second zone line isolator connects the zone to the second power line if the zone contains an open circuit fault.

3. The system of claim 1, further comprising a circuit controller and a system line isolator.

4. The system of claim 3, wherein the system line isolator is connected between the first power line and the circuit controller and disconnects the circuit controller from the first power line when the short circuit fault is present.

5. The system of claim 4, wherein in response to the system line isolator disconnecting the circuit controller from the first power line, each of the first zone line isolators of the plurality of zones disconnect the respective zone from the first power line.

6. A method for isolating short circuit faults in an emergency system, the method comprising:

detecting a short circuit fault in one of a plurality of zones, each zone having first and second zone line isolators, the first zone line isolator connected to a first power line, and the second zone line isolator connected to a second power line;

opening all first zone line isolators to disconnect the first power line from each zone;

checking each of the plurality of zones to determine if the short circuit fault is present; and closing each first zone line isolator for each respective zone that does not contain the short circuit fault in order to provide power to the respective zone from the first power line.

7. The method of claim 6, wherein the first and second power lines receive power from a circuit controller.

8. The method of claim 7, wherein a system line isolator is connected between the first power line and the circuit controller.

9. The method of claim 8, wherein opening all the first zone line isolators comprises opening the system line isolator to disconnect power from the first power line, and opening each of the first zone line isolators for each respective zone in response to the loss of power on the first power line.

10. The method of claim 6, wherein checking each of the plurality of zones for the short circuit fault includes the first zone line isolator of each of the respective zones using power from the first power line to apply a current to the respective zone.

11. An emergency system comprising:

first and second power lines;

a plurality of emergency devices organized to form a plurality of zones;

a plurality of first zone line isolators, each first zone line isolator connected to one of the zones and to the first power line; and a plurality of second zone line isolators, each second zone line isolator connected to one of the zones and to the second power line, and configured to connect the zone to the second power line when an open circuit condition occurs in the zone, wherein when a short circuit condition is detected in at least one of a plurality of zones, each first zone line isolator is configured to disconnect the first power line from the respective zone, and wherein each of the plurality of zones is configured to determine if the short circuit condition is present in the zone, and wherein each first zone line isolator is configured to close for each respective zone that does not contain the short circuit condition in order to provide power to the respective zone from the first power line.

12. The emergency system of claim 11, further comprising a circuit controller and a system line isolator.

13. The emergency system of claim 12, wherein the system line isolator is connected between the circuit controller and the first power line, and is configured to disconnect the circuit controller from the first power line when the short circuit condition occurs.

14. The emergency system of claim 12, wherein the plurality of second zone line isolators connect the respective zone to the second power line in response to a loss of power from the respective zone due to the occurrence of the open circuit condition.

* * * * *